(12) United States Patent
Noel

(10) Patent No.: US 10,029,270 B2
(45) Date of Patent: Jul. 24, 2018

(54) SUPPORT TROLLEY FOR SUPPORTING A DOOR OF AN AIRCRAFT

(71) Applicant: Airbus Operations GmbH, Hamburg (DE)

(72) Inventor: Mathieu Noel, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 18 days.

(21) Appl. No.: 14/942,155

(22) Filed: Nov. 16, 2015

(65) Prior Publication Data

US 2016/0137315 A1    May 19, 2016

(30) Foreign Application Priority Data

Nov. 17, 2014  (EP) .................................. 14193549
Nov. 17, 2014  (EP) .................................. 14193550

(51) Int. Cl.
*B05B 13/02*    (2006.01)
*B64F 5/50*    (2017.01)

(52) U.S. Cl.
CPC ............ *B05B 13/0285* (2013.01); *B64F 5/50* (2017.01)

(58) Field of Classification Search
CPC .. B64F 5/0009; B64F 5/50; B64F 5/60; B05B 13/0285; B62B 3/108
See application file for complete search history.

(56) References Cited

U.S. PATENT DOCUMENTS

| 1,363,020 A | * | 12/1920 | Shewalter ............ B25H 1/0007 269/17 |
| 3,218,056 A | * | 11/1965 | Kaplan ................ B25H 1/0007 269/17 |
| 4,239,196 A | * | 12/1980 | Hanger ................ B25H 1/0007 269/17 |
| 4,530,492 A | | 7/1985 | Bork |
| 5,879,021 A | | 3/1999 | Papendick |
| 6,533,260 B1 | | 3/2003 | Mock |

FOREIGN PATENT DOCUMENTS

| DE | 690462 C | * | 4/1940 | ......... B05B 13/0285 |
| DE | 10007578 A1 | * | 9/2001 | ......... B05B 13/0285 |
| GB | 2 223 460 A | | 4/1990 | |
| GB | 2 329 613 A | | 3/1999 | |

OTHER PUBLICATIONS

European Search Report for Application No. 14193550.2 dated Apr. 22, 2015.
European Search Report for Application No. 14193549.4 dated Apr. 22, 2015.

* cited by examiner

*Primary Examiner* — Christopher M Koehler
*Assistant Examiner* — Joel Crandall
(74) *Attorney, Agent, or Firm* — Jenkins, Wilson, Taylor & Hunt, P.A.

(57) ABSTRACT

A support trolley for supporting a door of an aircraft to permit working on the door comprises a frame with an upper support portion having at least two pairs of support bolts for engagement with locking bolts of the door to be supported so that the door is supported at each lateral side by a pair of support bolts. For engagement with the locking bolts the support bolts comprise recesses at their free ends.

14 Claims, 5 Drawing Sheets

SUPPORT TROLLEY FOR SUPPORTING A DOOR OF AN AIRCRAFT

CROSS-REFERENCE TO RELATED APPLICATION

This application claims priority to European Patent Application Nos. 14193549.4 and 14193550.2, both filed Nov. 17, 2014, the entire disclosures of which are incorporated by reference herein.

TECHNICAL FIELD

The disclosure herein relates to a support trolley for supporting a door of an aircraft to permit working on the door, e.g. painting of the door.

BACKGROUND

Generally, all work including painting on the door of an aircraft is done at the plant for manufacturing such doors in which plant corresponding assembly racks are provided. However, when the door of an aircraft needs to be removed from the fuselage of the aircraft to repair and/or repaint the door, it is difficult to position the door in the vicinity of the parked aircraft so that all the areas to be worked on become accessible.

SUMMARY

Thus, it is an object of the disclosure herein to provide for a support trolley which can support a door of an aircraft in a way that permits access to essentially all parts of the door.

To solve such problem, the support trolley comprises a frame with an upper support portion having at least two pairs of support bolts having a receiving recess at its free end for engagement with locking bolts of the door to be supported so that the door is supported at each lateral side by a pair of support bolts.

As the support bolts engage with the locking bolts of the door which locking bolts form part of the mechanism for locking the closed door to the fuselage, the door is mounted on the support trolley only by engagement of the support bolts with the locking bolts so that essentially all parts of the door remain accessible for repair, repainting and the like. The support trolley may placed anywhere near the parked aircraft and can be easily moved around.

Preferably, the support bolts are movable between a release position in which the locking bolts can be brought in engagement with the support bolts, and a support position in which the support bolts are fixed to the upper support portion of the support trolley.

By such an arrangement the support bolts can be removed from the support portion and can be brought into engagement with the locking bolts of the door hanging on a crane or the like. Then the door including the support bolts can be moved to a position in which the support bolts can be fixed to the upper support portion of the support trolley.

The receiving recess of the supporting bolts is preferably arranged eccentrically or laterally offset with respect to the longitudinal axis of the support bolt.

By providing an eccentric or laterally offset arrangement of the receiving recess, the support bolt may be rotated when in engagement with the locking bolt to adapt to slight differences in position of the locking bolts on the door dependent on the overall curvature of the door. Such curvatures differ somewhat dependent on the position of the door on the fuselage.

In its support position each support bolt may be held by a releasable clamping mechanism which comprises a clamp with a pivotable element and a clamping bolt.

When opening the clamp by pivoting the pivotable element, the support bolt can be inserted and thereafter clamped in its support position by closing the pivotable element and tightening the clamping bolt.

The support bolts may be provided on support beams which are height-adjustably mounted on the upper support portion.

To adapt to different sizes of aircraft doors, the distance between the bolts of both pairs of support bolts may be adjustable.

In a preferred arrangement the upper support portion of the support trolley comprises a sub-frame on which the support bolts are mounted and which in its horizontal position is located in a plane parallel to the support plane formed by the rollers of the trolley, wherein the sub-frame is pivotable out of its horizontal position about an axis which extends in parallel to the axes of the support bolts, wherein the axis is preferably located offset from the middle of the sub-frame by between 15% and 20% of the length of the sub-frame.

By pivoting the sub-frame carrying a door, the position of the door can be adapted so that easier access to areas becomes possible which areas are not that easy accessible when the door is in its horizontal position.

The sub-frame may be lockable in its horizontal position and in at least one inclined position.

In another preferred embodiment the frame is provided with rollers and the upper support portion comprises a sub-frame on which the support bolts are mounted. The sub-frame is rotatable with respect to the frame about an axis of rotation which extends perpendicular with respect to the axes of the support bolts and in parallel to the support plane formed by the rollers.

As the support bolts engage with the locking bolts of the door which locking bolts form part of the mechanism for locking the closed door to the fuselage, the door is mounted on the support trolley only by engagement of the support bolts with the locking bolts so that essentially all parts of the door remain accessible for repair, repainting and the like. The support trolley may placed anywhere near the parked aircraft and can be easily moved around. By rotating the sub-frame about the axis of rotation to a suitable position, all areas of the door to be worked on become accessible without requiring ladders or the like. In addition, the support trolley may be placed anywhere near the parked aircraft and can be easily moved around.

Preferably, the sub-frame can be locked in a horizontal position in which the axes of the support bolts extend in a plane parallel to the support plane formed by the rollers, and in several inclined positions.

To provide for an additional stabilization of the aircraft door mounted on the trolley in all possible positions of the sub-frame an elongated support strut may be releasably attached to the sub-frame which support strut extends in parallel to the axis of rotation and comprises positioning elements for engagement with the door. By these positioning elements the door is supported in addition to the engagement of the support bolts with the locking bolts in particular when the sub-frame is moved out of its horizontal position. In addition the support strut provides for a stabilization of the subframe against deformation due to the load of the door.

In the horizontal position of the sub-frame the elongated support strut extends preferably in a plane which extends perpendicular with respect to the support plane, i.e. the support strut is located in the middle of the sub-frame.

On the support strut at least one transverse arm may be provided which extends at both sides of the support strut and carries at least two positioning elements.

In a preferred embodiment the sub-frame is mounted between supporting struts located at the ends of the frame, so that the sub-frame can be rotated by 360°. For effecting such rotation, a crank mechanism with a crank handle may be provided on one of the supporting struts at one end of the frame which crank mechanism is coupled with a shaft secured of the sub-frame coaxially with respect to the axis of rotation.

BRIEF DESCRIPTION OF THE DRAWINGS

In the following a first and a second embodiment of the disclosure herein will be described with respect to the figures.

DETAILED DESCRIPTION

Figure 1:
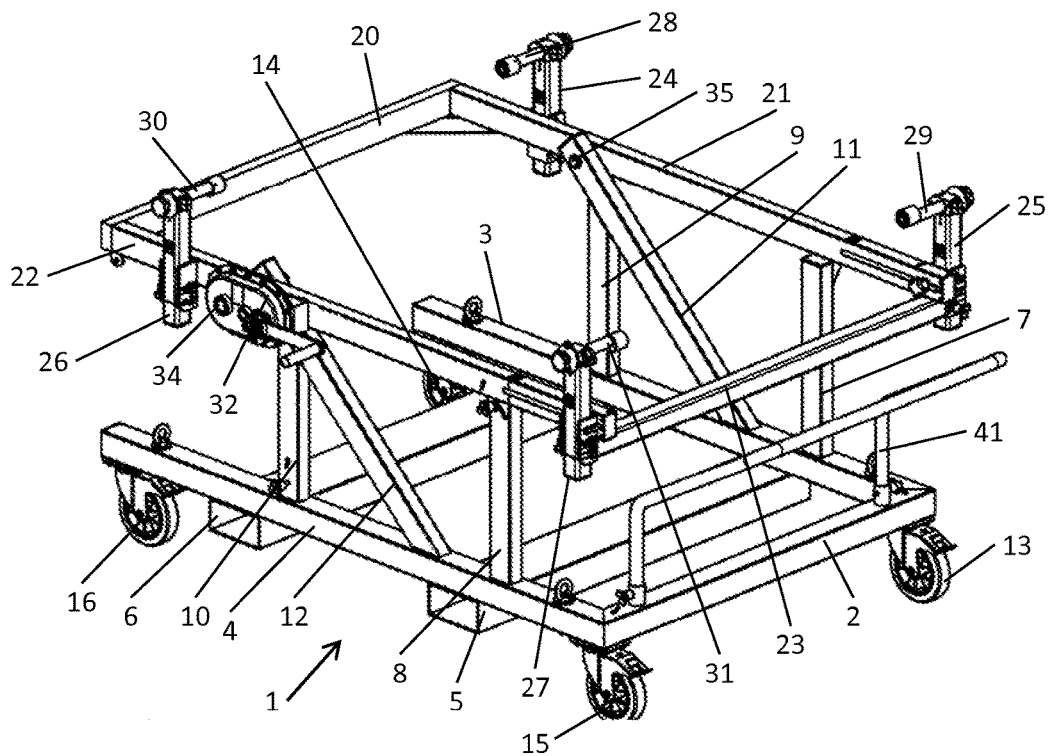
FIG. 1 shows a perspective view of a first embodiment of a support trolley.
Figure 2:
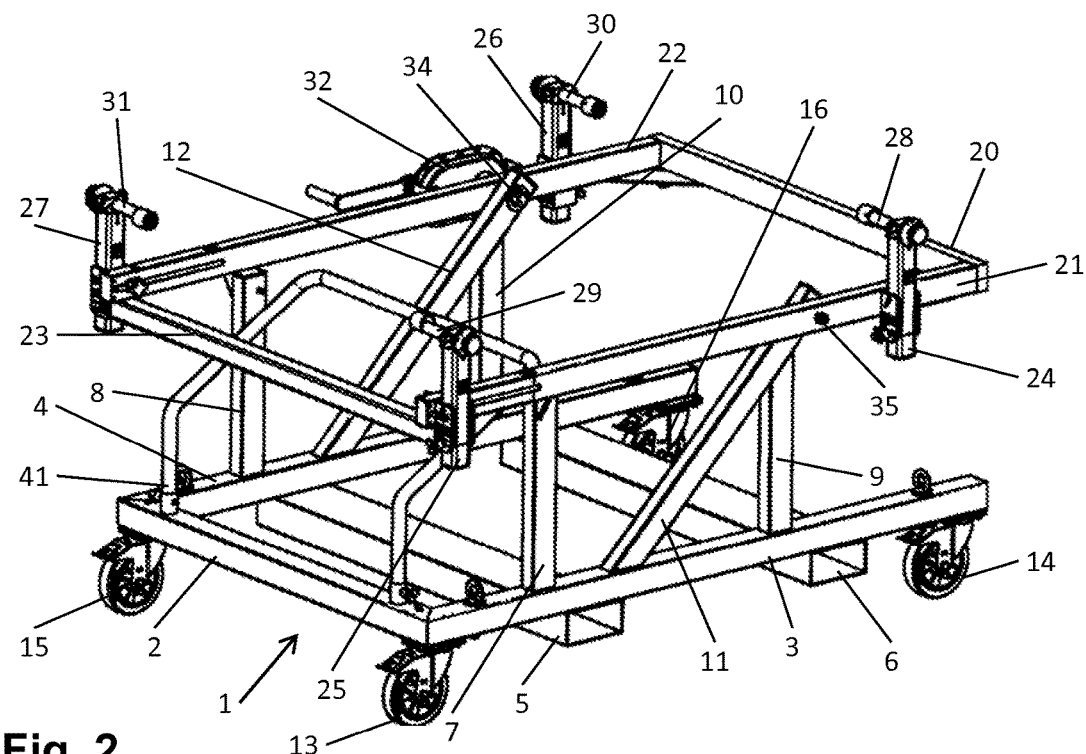
FIG. 2 shows another perspective view of the support trolley of FIG. 1.
Figure 3:
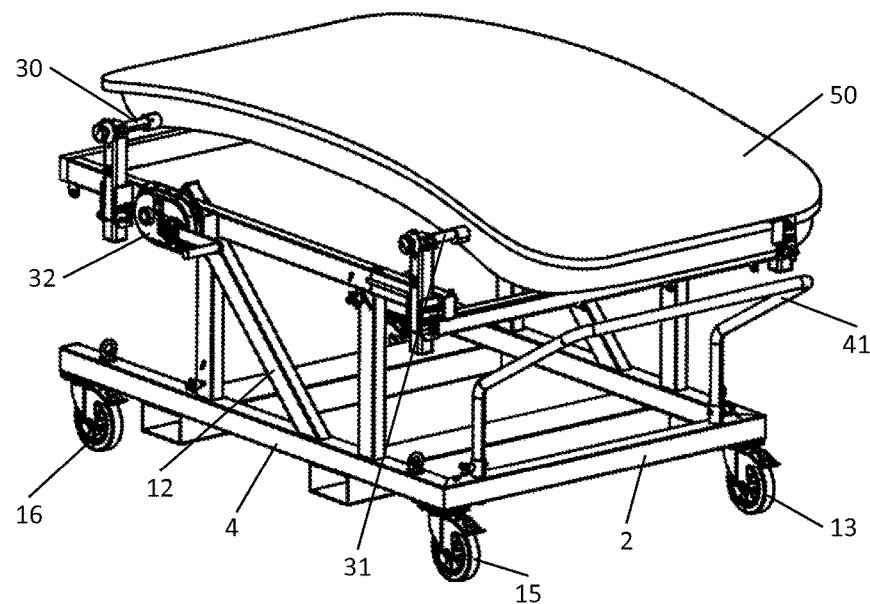
FIG. 3 shows a view of the support trolley corresponding to FIG. 1 with an aircraft door mounted thereon.

The first embodiment of a support trolley 1 shown in FIGS. 1 to 3 comprises a frame formed by interconnected beams 2, 3, 4, 5, 6 and upstanding beams 7, 8, 9, 10 as well as inclined beams 11, 12. To this frame rollers 13, 14, 15, 16 are attached which can be releasably locked to prevent movement of the trolley 1. On top of the frame a sub-frame is provided which comprises beams 20, 21, 22, 23 and is connected to the frame by a shaft 34 and a bolt 35. In its horizontal position shown in the figures the sub-frame rests on upstanding beams 7, 8 of the frame.

On the beams 21, 22 of the sub-frame pairs of support bolts 28, 29 and 30, 31 are mounted by upstanding support beams 24, 25, 26, 27. These support beams 24, 25, 26, 27 are height-adjustable and are held in position by corresponding clamping mechanisms not shown in detail. The distances between the support bolts 28, 29, 30, 31 of each pair of support bolts 28, 29, 30, 31 can be adjusted by displacing the support beam 25 and the support beam 27 along slots in beams 21, 22. In the adjusted position the support beams 25, 27 can be clamped to the beams 21, 22.

Figure 8:
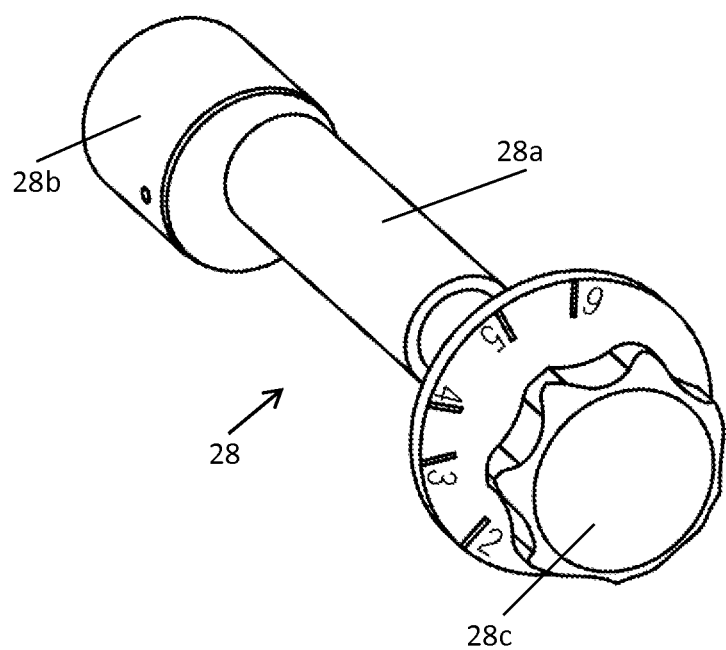
FIG. 8 shows a perspective view of a support bolt.
Figure 9:
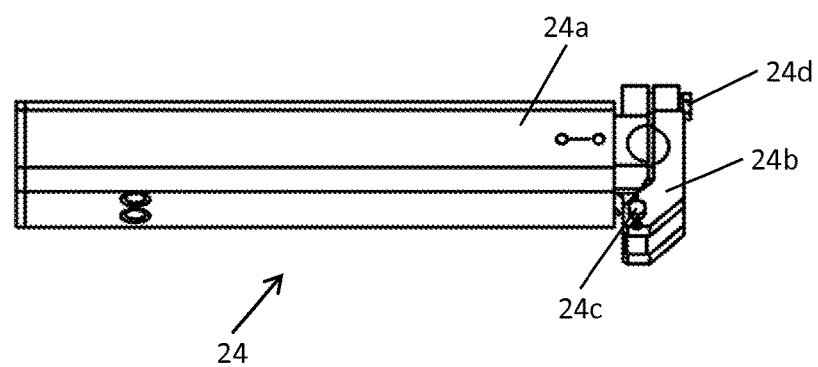
FIG. 9 shows a perspective view of a support beam with a clamping mechanism for a support bolt.

As indicated in FIG. 9, the support beams (here support beam 24) comprise a clamping mechanism at the upper ends of their beam body 24a. The clamping mechanism comprises a pivotable clamping element 24b pivotable about an axis 24c so that in the closed state an essentially circular opening is provided, whereas in the open state the shaft body 28a of a support bolt 28 (FIG. 8) can be inserted. As indicated in FIGS. 1 and 2, recesses are provided in the free ends of the support bolts 28, 29, 30, 31 for receiving locking bolts of an aircraft door, wherein, as shown in FIG. 8, the portion of the support bolt 28b comprising the recess is arranged eccentrically or laterally offset with respect to the longitudinal axis of the shaft portion 28a. Thereby, when the support bolt 28 is inserted in the clamping mechanism of the support beam 24 and the clamping element 24b is not yet tightly clamped in engagement with the shaft portion 28a by a clamping bolt 24d, the support bolt 28 can be rotated by manual engagement of the knob 28c and thereby the recess can be moved to a position to compensate for slight misalignments with respect to the corresponding locking bolt of the aircraft door to be supported.

To mount an aircraft door 50 on the support trolley 1 shown, as indicated in FIG. 3, the support bolts 28, 29, 30, 31 are removed from their clamping mechanisms and are pushed onto locking bolts (not shown) of the aircraft door which is held by a crane or the like. Then the door 50 together with the support bolts 28, 29, 30, 31 is moved to a position in which the support bolts 28, 29, 30, 31 engage with the upper ends of the support beams 24, 25, 26, 27 which have their clamping elements 24b moved to an open position. After possibly adjusting one or more of the support bolts 28, 29, 30, 31 to compensate for slight differences in adjustment, the clamping elements are moved to their closed positions and clamping is effected by tightening the corresponding clamping bolts 24d. Thus, the aircraft door 50 is held in position, as indicated in FIG. 3 in which position e.g. the outer surface of the door 50 may be repainted.

To move the sub-frame 24, 25, 26, 27 together with the door 50 supported to an inclined position, the crank handle of the crank mechanism 32 can be rotated which results in a rotation of the sub-frame 20, 21, 22, 23 about the axis of shaft 34 and bolt 35 arranged coaxially with respect to shaft 34. In both the horizontal position and in at least one inclined position the sub-frame 20, 21, 22, 23 can be locked with respect to the frame 2, 3, 4, 5, 6 by means not shown in the drawings.

As shown in FIGS. 1 to 3 a handle 41 can be releasably attached to the frame 2, 3, 4, 5, 6 to facilitate movement of the support trolley 1.

Figure 4:
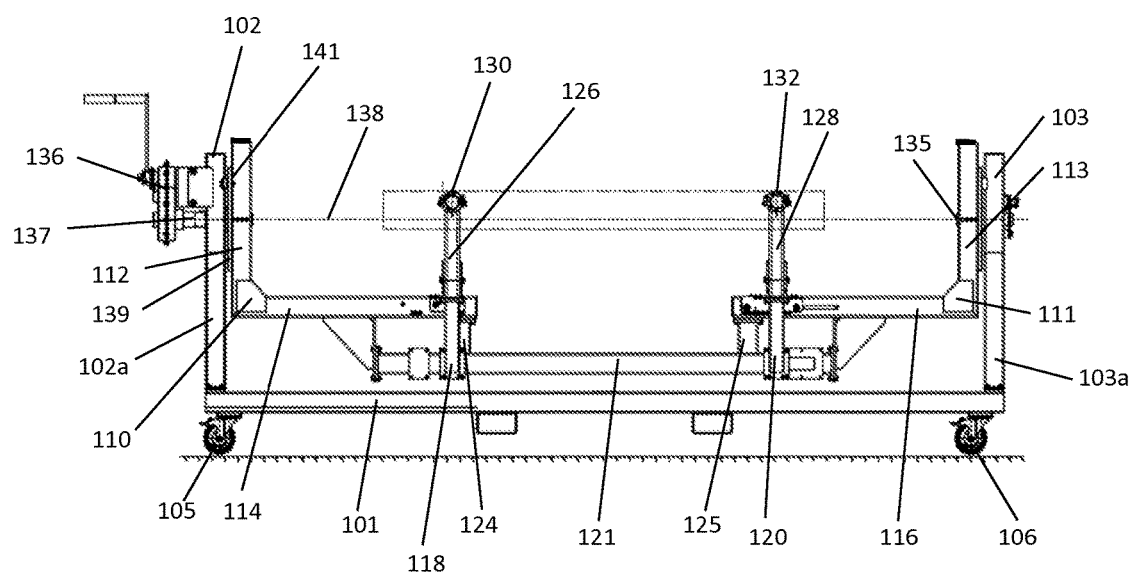
FIGS. 4 and 5 schematically show a side view and an end view of a second embodiment of a support trolley.
Figure 5:
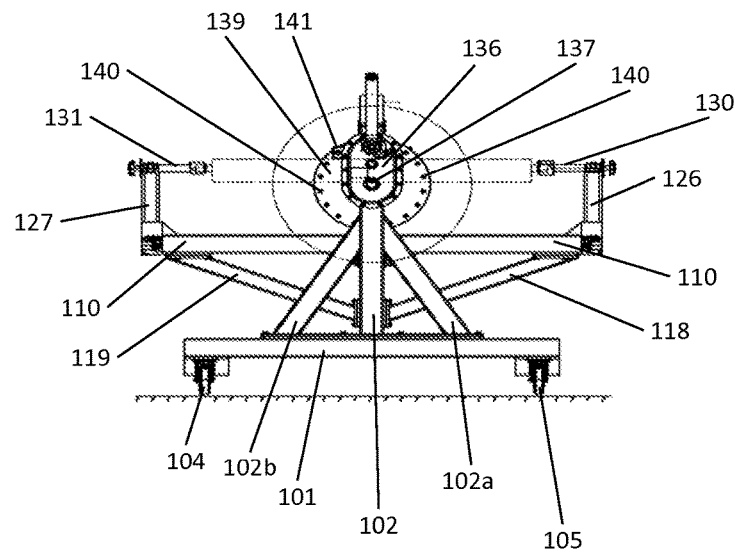

The second embodiment of a support trolley shown in FIGS. 4 and 5 comprises a frame formed by a rectangular base section 101 of four elongated beams and supporting struts 102 and 103 at the opposite narrow ends of the base section 101 as well as inclined enforcement struts 102a, 102b and 103a whereas the second enforcement strut at the right hand end in FIG. 4 corresponding enforcement strut 102b is not shown. Transverse enforcement beams indicated in FIG. 4 but not designated and not shown in FIG. 5 may be provided to enforce the base section 1. To this base section 1 lockable rollers 104, 105, 106 (the fourth roller is not shown) are attached in the corner areas of the base section 101.

An upper support portion comprising a sub-frame having U-shaped frame sections 110, 114 and 111, 116 (the second leg of each frame section corresponding to leg 114 and to leg 116 is not shown) which frame sections are interconnected by a beam 121. This interconnection is effected by columns 124, 125 and inclined enforcement beams 118, 119 and 120 (the enforcement beam cooperating with enforcement beam 120 and corresponding to enforcement beam 19 is not shown). From the beams 110 and 111 forming the bases of the U-shaped frame sections beams 112, 113 extend upwardly. They are located in the middle of beams 110 and 111 and are coupled with supporting struts 102 and 103, on the one hand by a shaft 137 fixed to beam 112 and rotatable with respect to supporting strut 102 and on the other hand by a bolt 135 (not shown in detail) which is fixed to beam 113 and rotatably mounted in supporting strut 103. Shaft 137 and bolt 135 are arranged coaxially and form an axis of rotation 138 about which the sub-frame can be rotated by 360° with respect to the frame.

To effect such rotation a crank mechanism 136 (not shown in detail) comprising a crank handle and mounted on supporting strut 102 is coupled with the shaft 137 so that upon rotation of the crank handle the shaft 137 and thereby the sub-frame is rotated about the axis of rotation 138.

Between supporting strut 102 of the frame and beam 112 of the sub-frame a disc 139 is located with its center position on the shaft 137 and non-rotatably connected with the beam 112. The disc 139 comprises a plurality of holes 140 arranged on a circle about the axis of rotation 138.

On the supporting strut 102 a plate 141 is provided which comprises a hole in a distance from the axis of rotation which distance is identical to the radius of the circle on which the holes 40 are arranged. Thus, in each rotational position of the sub-frame defined by one of the holes 140 a locking bolt can be inserted into the hole in plate 141 and a hole 140 brought in alignment therewith and thereby the sub-frame is locked in its corresponding position.

Figure 6:
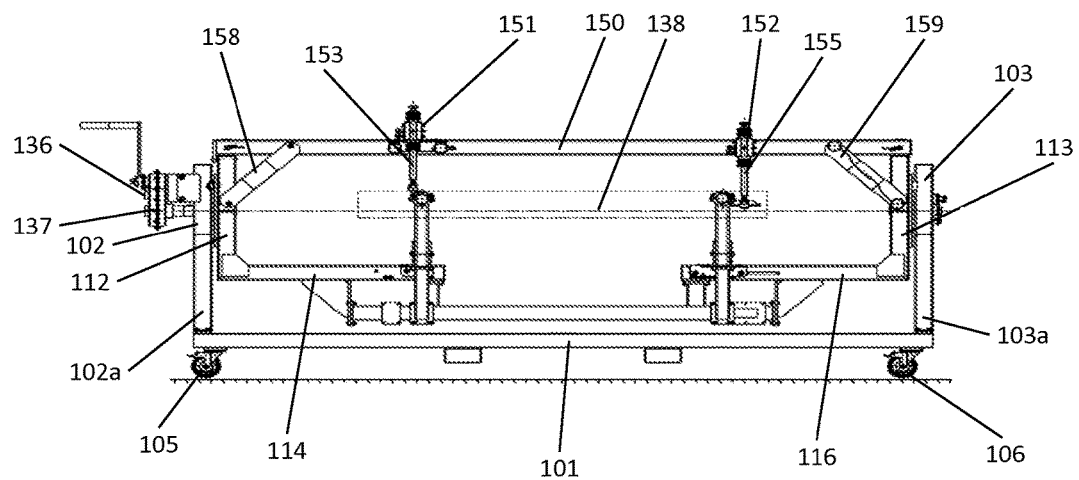
FIGS. 6 and 7 show the support trolley of FIGS. 4 and 5 completed by a releasable elongated support strut.
Figure 7:
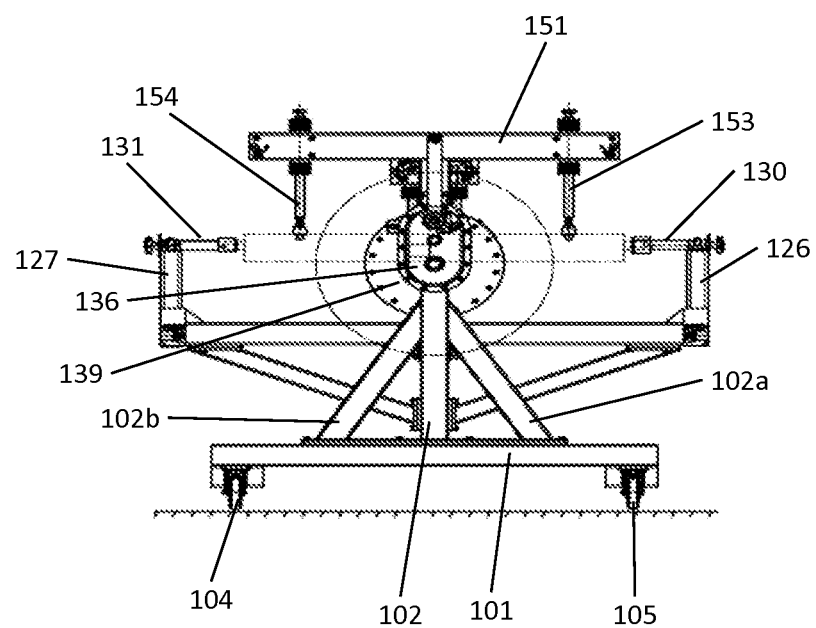

In FIGS. 6 and 7 the second embodiment of a support trolley of FIGS. 4 and 5 is shown completed by a releasably mounted elongated support strut 150 which extends between beams 112 and 113 of the sub-frame and is attached to their upper ends wherein releasably mounted enforcement struts 158, 159 ensure a stable connection. The support strut 150 comprises transverse arms 151, 152 which extend to both sides of the support strut and on which engagement elements 153, 154, 155 are mounted which are height-adjustable.

When an aircraft door (indicated in chain dotted lines in FIGS. 4 to 7) is mounted on the support trolley the support strut 150 will be attached to the sub-frame and the engagement elements can be brought into engagement with the upper surface (in FIGS. 4 to 7) of the door either in an abutting engagement or in an engagement with holes provided in the upper surface so that the aircraft door is safely held in its position when the sub-frame is rotated, e.g. by 180° from the position shown in FIGS. 4 to 7.

For mounting an aircraft door on the support trolley, two pairs of support bolts 130, 132 and 131 (the second bolt of this pair is not shown in the drawings) are provided. The bolts are mounted on upstanding support beams 126, 127, 128 which are height-adjustably clamped to the legs of the U-shaped frame sections 114, 116 so that the upstanding support beams 126, 127, 128 carrying the pair of support bolts 130, 131, 132 are attached to the legs which are in alignment and therefore to one side of the sub-frame whereas the other support beams 126, 127, 128 are attached to the legs at the opposite side of the sub-frame. The support beams 126, 127, 128 are held in position by corresponding clamping mechanisms not shown in detail. The distances between the support bolts 130, 131, 132 of each pair of support bolts 130, 131, 132 can be adjusted by displacing support beam 128 and the not shown support beam of the other pair of support bolts 130, 131, 132 along slots in the legs of the U-shaped frame sections as indicated in FIGS. 4 and 6. In the adjusted position these support beams 128 can be clamped to the legs with clamping structure not described in detail.

The support bolts 130, 131 and 132 and the support beams 126, 127, 128 are formed in the same manner as the previously described support bolt 28 shown in FIG. 8 and the previously discussed support beam 24 shown in FIG. 9, respectively.

To mount an aircraft door on the support trolley, the support bolts 130, 131, 132 are removed from their clamping mechanisms and are pushed onto locking bolts of the aircraft door indicated in FIGS. 5 and 7 while the door is held by a crane or the like. Then the door together with the support bolts 130, 131, 132 is moved to a position in which the support bolts 130, 131, 132 engage with the upper ends of the support beams 126, 127, 128 which have their clamping elements 126*b* moved to an open position. After possibly adjusting one or more of the support bolts 130, 131, 132 to compensate for slight differences in adjustment of the support bolts 130, 131, 132 with respect to the locking bolts, the clamping elements 126*b* are moved to the closed position and clamping is effected by tightening the corresponding bolts 126*d*. Thus, the aircraft door is held in position, as indicated in FIGS. 4 and 5 in which position, e.g. the outer surface of the door may be repainted.

When the aircraft door is mounted as shown in FIGS. 4 and 5 the elongated supporting strut 150 may be attached as described above.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A support trolley for supporting a door of an aircraft to permit working on the door, comprising:
    a frame with an upper support portion having at least two pairs of support bolts with a receiving recess at each support bolt free end for engagement with locking bolts of the door to be supported so that the door is supported at each lateral side by one pair of the at least two pairs of support bolts; and
    the frame comprising rollers and the upper support portion comprising a sub-frame on which the at least two pairs of support bolts are mounted;
    wherein the sub-frame is rotatable with respect to the frame about an axis of rotation which extends perpendicular with respect to the axes of each support bolt and in parallel to a support plane formed by the rollers, and
    wherein an elongated support strut is releasably attached to the sub-frame and extends in parallel to the axis of rotation which support strut further comprises positioning elements for engagement with the door.

2. The support trolley according to claim 1, wherein the support bolts are movable between a release position in which the locking bolts can be brought in engagement with the support bolts, and a support position in which the support bolts are fixed to the upper support portion.

3. The support trolley according to claim 2, wherein in its support position each support bolt is held by a releasable clamping mechanism which comprises a clamp with a pivotable element and a clamping bolt.

4. The support trolley according to claim 1, wherein the receiving recess is arranged eccentrically with respect to the longitudinal axis of the support bolt.

5. The support trolley according to claim 1, wherein the support bolts are provided on support beams height-adjustably mounted on the upper support portion.

6. The support trolley according to claim 1, wherein the distance between the support bolts of both pairs of support bolts is adjustable.

7. The support trolley according to claim 1,
wherein the upper support portion comprises a sub-frame on which the support bolts are mounted,
wherein the sub-frame in its horizontal position is located in a plane parallel to a support plane formed by rollers of the trolley, and
wherein the sub-frame is pivotable out of its horizontal position about an axis which extends in parallel to the axes of the support bolts.

8. The support trolley according to claim 7, wherein the pivotabe axis of the subframe is located offset from a middle of the sub-frame by between 15% and 20% of the length of the sub-frame.

9. The support trolley according to claim 7, wherein the sub-frame can be locked in its horizontal position and in at least one inclined position.

10. The support trolley according to claim 1, wherein the sub-frame can be locked in a horizontal position in which the axes of the support bolts extend in a plane parallel to the support plane formed by the rollers, and in several inclined positions.

11. The support trolley according to claim 1, wherein in the horizontal position of the sub-frame the elongated support strut extends in a plane which extends perpendicular with respect to the support plane.

12. The support trolley according to claim 1, wherein the elongated support strut comprises at least one transverse arm extending at both sides of the support strut and carrying at least two positioning elements.

13. The support trolley according to claim 1, wherein the sub-frame is mounted between supporting struts located at the ends of the frame so that the sub-frame can be rotated by 360°.

14. The support trolley according to claim 13, wherein at the at least one supporting strut at one end of the frame a crank mechanism with a crank handle is provided which is coupled with a shaft secured to the sub-frame coaxially with respect to the axis of rotation.

* * * * *